(12) United States Patent
Seo et al.

(10) Patent No.: US 9,515,806 B2
(45) Date of Patent: Dec. 6, 2016

(54) METHOD AND DEVICE FOR SENDING AND RECEIVING SIGNALS IN WIRELESS COMMUNICATION SYSTEM

(71) Applicant: LG Electronics Inc., Seoul (KR)

(72) Inventors: Inkwon Seo, Anyang-si (KR); Hanbyul Seo, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 42 days.

(21) Appl. No.: 14/384,134

(22) PCT Filed: Mar. 13, 2013

(86) PCT No.: PCT/KR2013/002008
§ 371 (c)(1),
(2) Date: Sep. 9, 2014

(87) PCT Pub. No.: WO2013/137639
PCT Pub. Date: Sep. 19, 2013

(65) Prior Publication Data
US 2015/0043544 A1  Feb. 12, 2015

Related U.S. Application Data

(60) Provisional application No. 61/610,458, filed on Mar. 13, 2012.

(51) Int. Cl.
*H04W 4/00* (2009.01)
*H04L 5/00* (2006.01)
*H04B 7/26* (2006.01)
*H04W 56/00* (2009.01)

(52) U.S. Cl.
CPC .......... *H04L 5/0058* (2013.01); *H04B 7/2656* (2013.01); *H04W 56/0005* (2013.01)

(58) Field of Classification Search
None
See application file for complete search history.

(56) References Cited

U.S. PATENT DOCUMENTS

| | | | |
|---|---|---|---|
| 2009/0180462 A1* | 7/2009 | Duerdodt | H04B 7/18591 370/347 |
| 2010/0027447 A1* | 2/2010 | Choi | H04L 5/0053 370/280 |
| 2010/0278083 A1 | 11/2010 | Kwak et al. | |
| 2011/0019634 A1* | 1/2011 | Fujii | H04W 16/14 370/329 |
| 2011/0149813 A1* | 6/2011 | Parkvall | H04B 7/2656 370/280 |
| 2011/0176461 A1* | 7/2011 | Astely | H04B 7/2656 370/280 |
| 2011/0310861 A1 | 12/2011 | Jia et al. | |
| 2012/0020256 A1 | 1/2012 | Tujkovic et al. | |
| 2012/0033589 A1 | 2/2012 | Zheng | |
| 2013/0188516 A1* | 7/2013 | He | H04W 28/16 370/254 |
| 2013/0188533 A1* | 7/2013 | He | H04J 3/1605 370/280 |

(Continued)

OTHER PUBLICATIONS

Alcatel-Lucent et al. "Draft CR to 36.213 for physical layer aspects of multiple TA", R1-120487, 3GPP TSG-RAN WG1 Meeting #67, Dresden, Germany, Feb. 6-10, 2012.

*Primary Examiner* — Anh-Vu Ly
(74) *Attorney, Agent, or Firm* — Dentons US LLP

(57) ABSTRACT

An embodiment of the present invention concerns a method whereby a base station transmits signals in a wireless communication system. The signal transmission method which comprises a step of transmitting a downlink signal in a first subframe set for uplink use, wherein the transmission timing of the first subframe is determined by means of a second subframe that precedes the first subframe, and a time value for a terminal receiving the first subframe is used in the second subframe.

11 Claims, 13 Drawing Sheets

(56) References Cited

U.S. PATENT DOCUMENTS

2013/0194980 A1* 8/2013 Yin .................. H04L 1/1854
  370/280
2013/0194982 A1* 8/2013 Fwu .................. H04W 72/085
  370/280
2013/0336302 A1* 12/2013 Lee .................. H04L 5/001
  370/336

* cited by examiner

FIG. 5
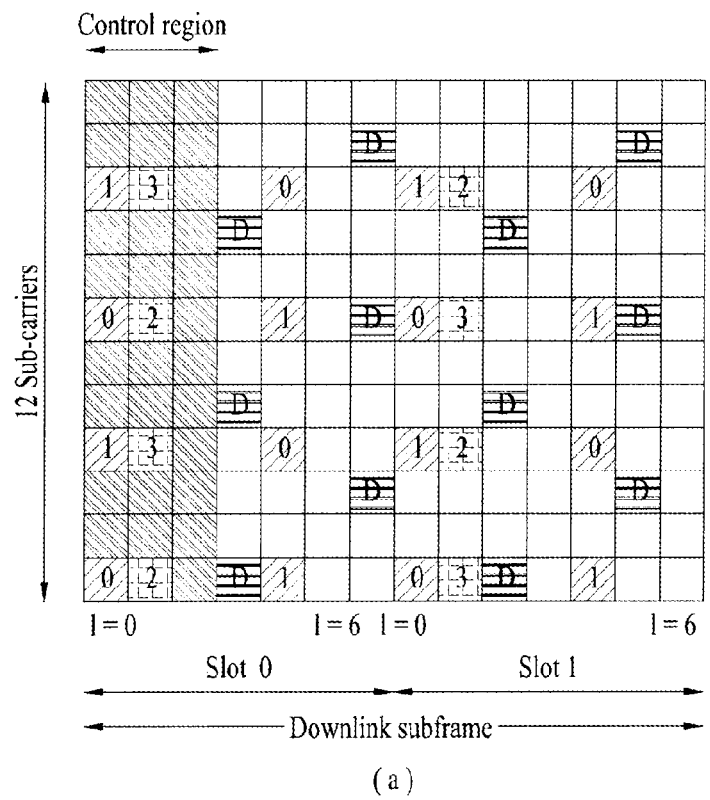
(a)
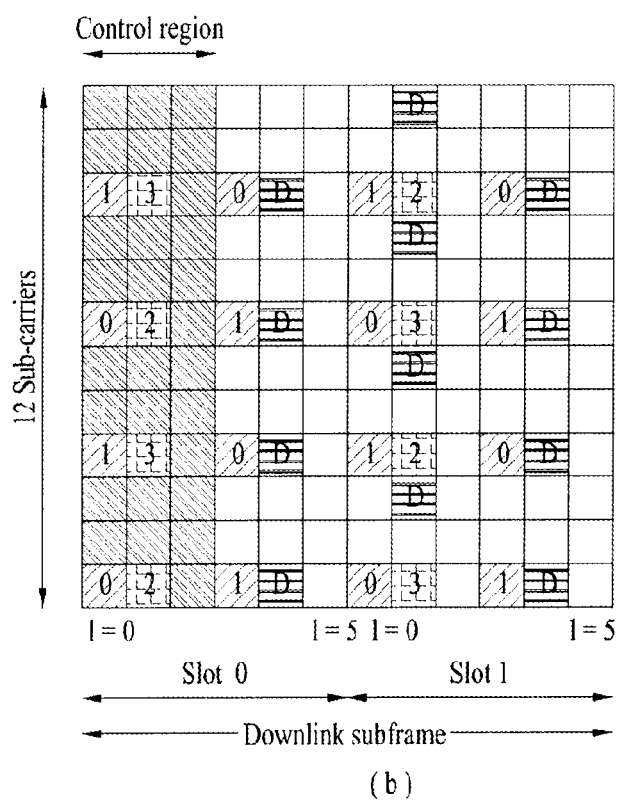
(b)

FIG. 7
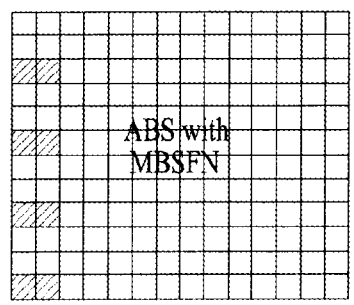
(a)
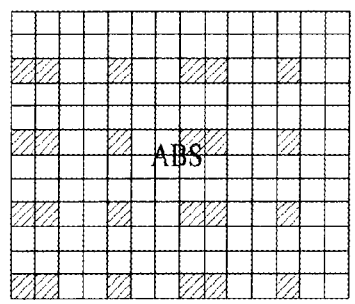
(b)

METHOD AND DEVICE FOR SENDING AND RECEIVING SIGNALS IN WIRELESS COMMUNICATION SYSTEM

This Application is a 35 U.S.C. §371 National Stage entry of International Application No. PCT/KR2013/002008 filed Mar. 13, 2013, which claims benefit of Provisional Application No. 61/610,458 filed Mar. 13, 2012, of which are incorporated by reference in their entirety herein.

TECHNICAL FIELD

The present invention relates to a wireless communication system and, more particularly, to a method and device for transmitting and receiving signals when transmission power of a downlink subframe significantly changes.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention devised to solve the problem lies in technologies related to transmission and reception of signals in the case in which transmission power is suddenly changed among consecutive downlink subframes by partial change in the time division duplex (TDD) configuration.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to a first aspect of the present invention, provided herein is a method for transmitting a signal by a base station in a wireless communication system, including transmitting a downlink signal in a first subframe configured to be used for uplink, wherein transmission timing of the first subframe is determined by a second subframe preceding the first subframe, wherein a time value for a user equipment receiving the first subframe is applied to the second subframe.

According to a second aspect of the present invention, provided herein is a base station in a wireless communication system including a transmit module, and a processor, wherein the processor transmitting a downlink signal in a first subframe configured to be used for uplink, wherein transmission timing of the first subframe is determined by a second subframe preceding the first subframe, wherein a time value for a user equipment receiving the first subframe is applied to the second subframe.

The first and second aspects of the present invention may include part or the entirety of elements disclosed below.

When a third subframe is configured to be used for downlink, a predetermined signal may be transmitted before the third subframe is transmitted after transmission of the first subframe, the third subframe being a subframe subsequent to the first subframe.

The time value may be a time between transmission of the first subframe and transmission of the third subframe.

Transmission power in the first subframe may be set to be lower than transmission power of the third subframe.

The predetermined signal may be one of a signal appointed for power tracking between the user equipment or the base station and a dummy signal.

The second subframe may be one of a special subframe or an uplink subframe subsequent to the special subframe.

According to a third aspect of the present invention, provided herein is a method for receiving a signal by a user equipment in a wireless communication system, including receiving a predetermined time value from a base station; and receiving a downlink signal from the base station through a first subframe, the first subframe being configured to be used for uplink, wherein reception timing of the first subframe is determined by a second subframe preceding the first subframe, wherein the predetermined time value is applied to the second subframe.

According to a fourth aspect of the present invention, provided herein is a user equipment in a wireless communication system including a receive module, and a processor, wherein the processor receives a predetermined time value from a base station, and receives a downlink signal from the base station through a first subframe, the first subframe being configured to be used for uplink, wherein reception timing of the first subframe is determined by a second subframe preceding the first subframe, wherein the predetermined time value is applied to the second subframe.

The third and fourth aspects of the present invention may include part or the entirety of elements disclosed below.

When a third subframe is configured to be used for downlink, the user equipment may perform power tracking after receiving the first subframe until the user equipment receives the third subframe, the third subframe being a subframe received subsequent to the first subframe.

The time value may be a time between transmission of the first subframe and transmission of the third subframe.

Transmission power in the first subframe may be set to be lower than transmission power of the third subframe.

The second subframe may be one of a special subframe or an uplink subframe subsequent to the special subframe.

Advantageous Effects

According to embodiments of the present invention, a user equipment may stably receive a signal through power tracking even if the transmission power suddenly changes among consecutive downlink subframes.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 illustrates a reference signal.

FIG. 7 is a diagram illustrating interference coordination.

BEST MODE

Figure 1:
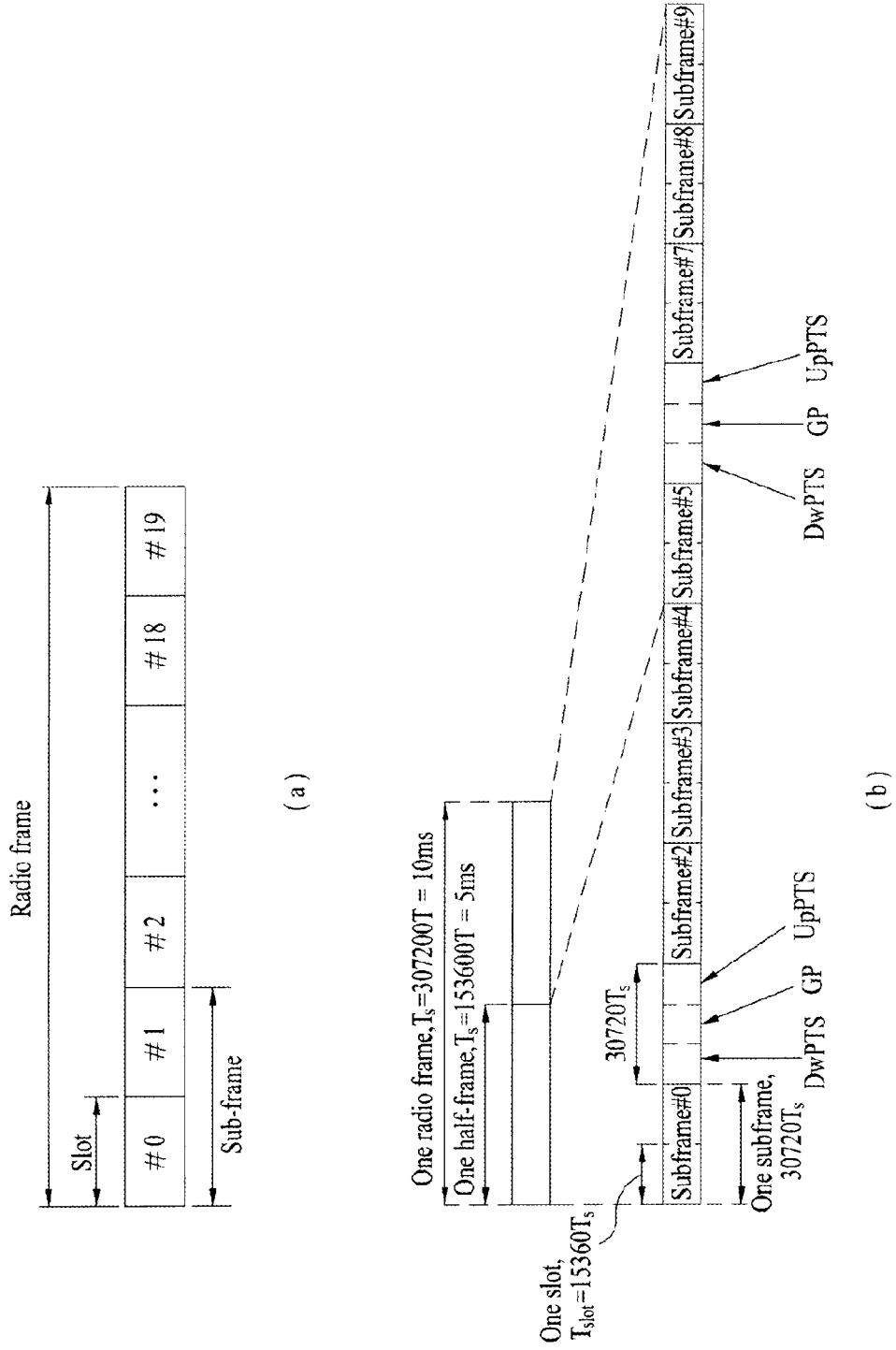
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LET-A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC- FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
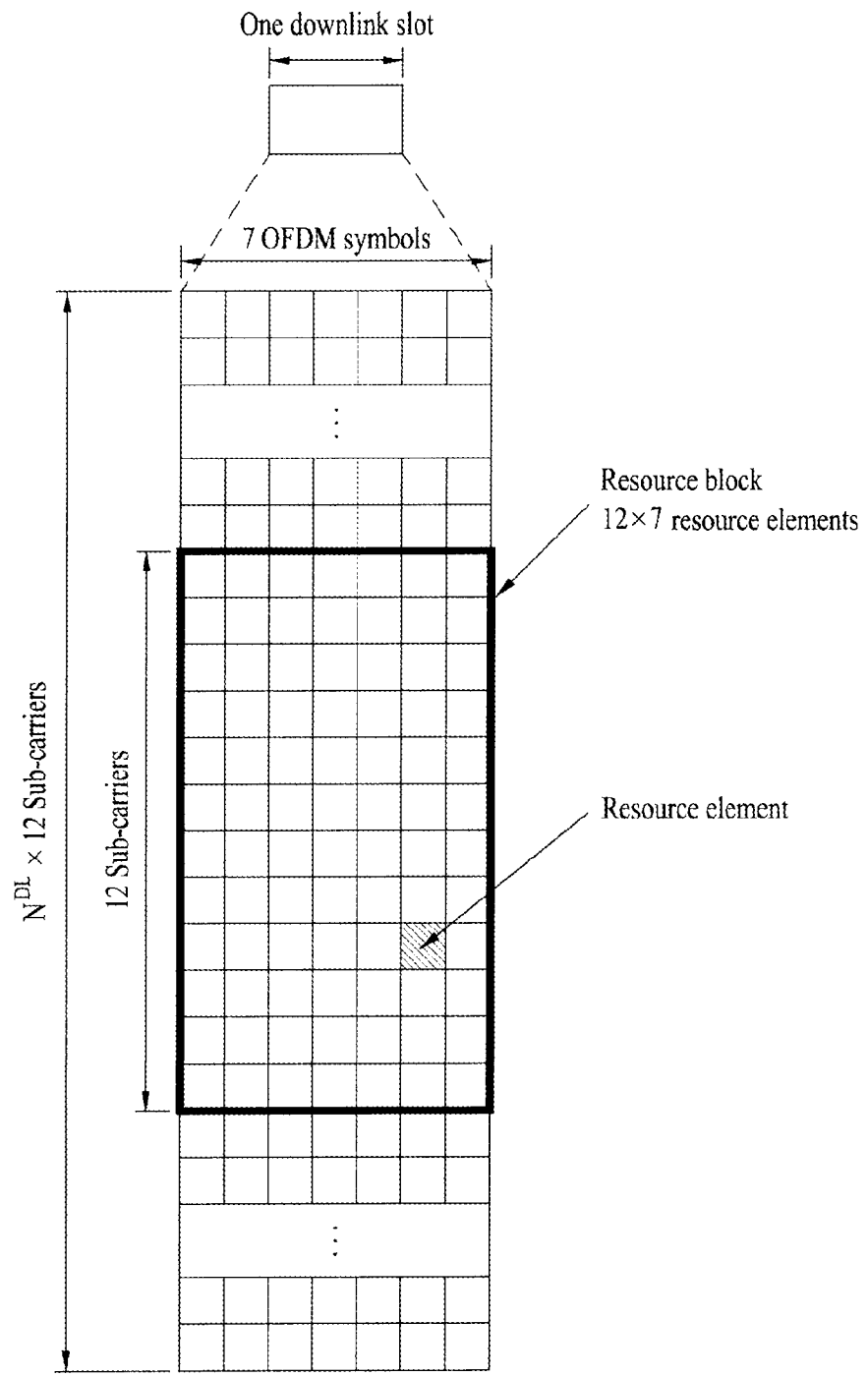
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
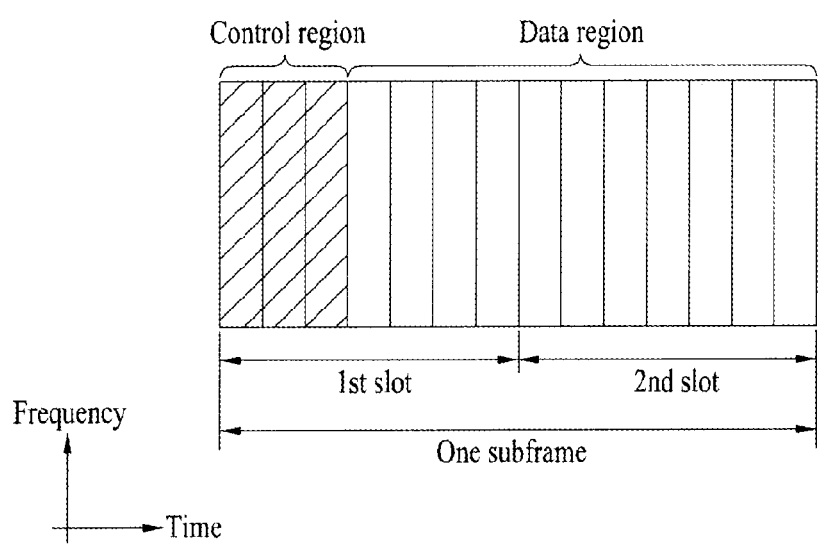
FIG. 3 is a diagram illustrating a DL subframe structure.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
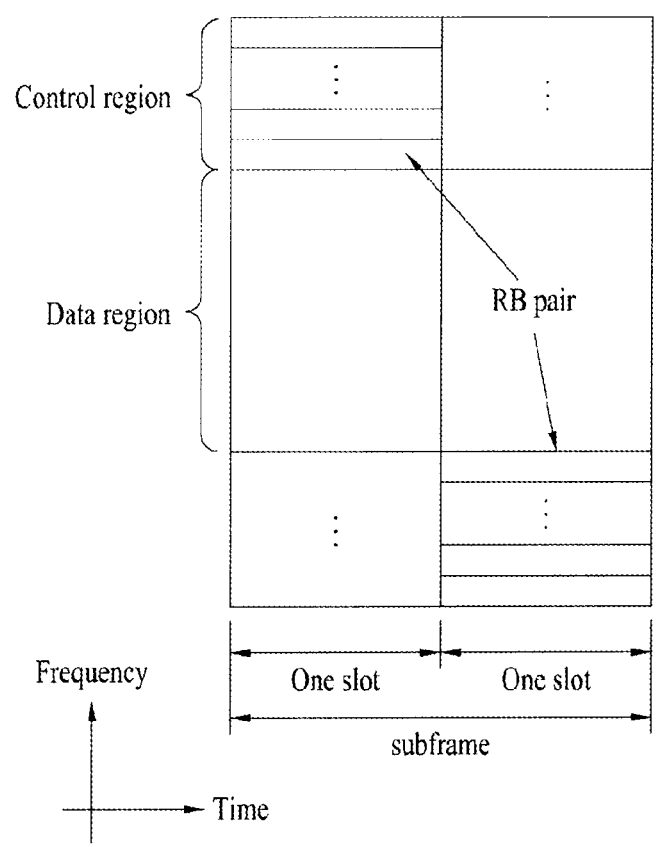
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In the current LTE system, the UL RSs include:

i) a demodulation-reference signal (DM-RS) for channel estimation for coherent demodulation of information transmitted over a PUSCH and a PUCCH, and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 5 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 5(a)) and a length of 12 OFDM symbols for an extended CP (FIG. 5(b)).

FIG. 5 shows locations of RSs on RB pairs in a system in which the BS supports four transmit antennas. In FIG. 5, resource elements (REs) denoted by "0", "1", "2" and "3" represent the locations of the CRSs for antenna port indexes 0, 1, 2 and 3, respectively. In FIG. 5, REs denoted by "D" represent locations of the DMRSs.

Heterogeneous Deployments

Figure 6:
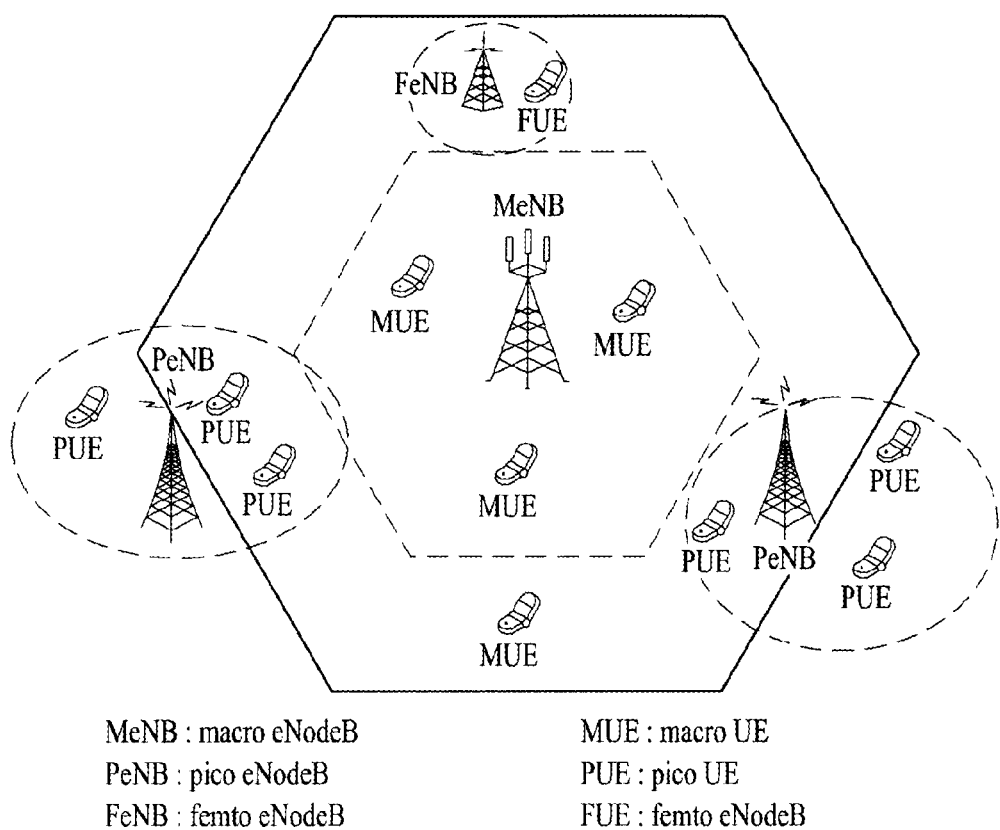
FIG. 6 is a diagram illustrating a heterogeneous network environment.

FIG. 6 illustrates a heterogeneous network wireless communication system including a macro eNB (MeNB) and micro eNBs (PeNBs or FeNBs). The term "heterogeneous network" refers to a network in which an MeNB and a PeNB or FeNB coexist even when they use the same radio access technology (RAT).

The MeNB is a normal eNB of a wireless communication system having wide coverage and high transmission power. The MeNB may be referred to as a macro cell.

The PeNB or FeNB may be referred to as, for example, a micro cell, pico cell, femto cell, home eNB (HeNB), relay, etc. (the exemplified PeNB or FeNB and MeNB may be collectively referred to as transmission points). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having a narrower coverage and lower transmission power than the MeNB.

A UE (hereinafter, referred to as a macro-UE (MUE)) may be directly served by the MeNB or a UE (hereinafter, referred to as a micro-UE) may be served by the PeNB or FeNB. In some cases, a PUE present in the coverage of the MeNB may be served by the MeNB.

PeNBs or FeNBs may be classified into two types according to whether UE access is limited.

The first type is an open access subscriber group (OSG) or non-closed access subscriber group (non-CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Inter Cell Interference Coordination (ICIC)

In the heterogeneous network environment and/or CoMP environment, interference between neighboring cells may be a problem. To address such inter-cell interference, inter-cell interference control (ICIC) may be applied.

As exemplary ICIC for the frequency resources, 3GPP LTE Release-8 defines a scheme of dividing a given frequency region (e.g., a system bandwidth) into one or more sub-regions (e.g., physical resource blocks (PRBs)) and exchanging an ICIC message for each frequency sub-region between cells. For example, as information included in the ICIC message for the frequency resources, relative narrowband transmission power (RNTP), which is related to downlink transmission power, and UL interference overhead indication (MI) and UL high interference indication (HII), which are related to uplink interference, are defined.

The RNTP is information indicating downlink transmission power used by a cell that transmits an ICIC message in a specific frequency sub-region. For example, setting an RNTP field for a specific frequency sub-region to a first value (e.g. 0) may mean that downlink transmission power of a corresponding cell does not exceed a predetermined threshold value in the specific frequency sub-region. Setting the RNTP field for the specific frequency sub-region to a second value (e.g., 1) may mean that the corresponding cell cannot guarantee the downlink transmission power in the specific frequency sub-region. In other words, the downlink transmission power of the cell can be regarded as low when the RNTP field is 0, whereas the downlink transmission power of the cell cannot be regarded as low when the value of the RNTP field is 1.

The UL IOI is information indicating the amount of uplink interference that a cell transmitting an ICIC message suffers from (or is subjected to) in a specific frequency sub-region. For example, an IOI field for a specific frequency sub-region set to a value corresponding to a high amount of interference may suggest that a corresponding cell suffers strong uplink interference in the specific frequency sub-region. In a frequency sub-region corresponding to IOI indicating strong uplink interference, a cell having received an ICIC message may schedule UEs that use low uplink transmission power from among UEs thereof. Thereby, UEs perform uplink transmission with low transmission power in the frequency sub-region corresponding to the IOI indicating strong uplink interference, and thus uplink interference that a neighboring cell (i.e. a cell having transmitted the ICIC message) suffers may be attenuated.

The UL HII is information indicating a degree of interference (or uplink interference sensitivity) that may be generated for a corresponding frequency sub-region according to uplink transmission in a cell transmitting an ICIC message. For example, if an HII field is set to a first value (e.g., 1) for a specific frequency sub-region, it may suggest that the cell transmitting the ICIC message can schedule UEs having high uplink transmission power for the specific frequency sub-region. On the other hand, if the HII field is set to a second value (e.g., 0) for the specific frequency sub-region, it may suggest that the cell transmitting the ICIC message can schedule UEs having low uplink transmission power for the specific frequency sub-region. Meanwhile, a cell having received the ICIC message may avoid interference from the cell having transmitted the ICIC message by scheduling UEs preferentially in a frequency sub-region for which the HII field is set to the second value (e.g., 0) and scheduling UEs capable of successfully operating in a strong interference environment in a frequency sub-region for which the HII field is set to the first value (e.g., 1).

As exemplary ICIC for the time resources, 3GPP LTE-A (or 3GPP LTE Release-10) defines a scheme of dividing the entire time domain into one or more time sub-regions (e.g., subframes) in frequency and exchanging information about whether silencing is performed for each time sub-region between cells. A cell transmitting an ICIC message may transmit, to neighboring cells, information indicating that silencing is performed in a specific subframe, and does not schedule a PDSCH or a PUSCH in the specific subframe. The cell receiving the ICIC message may schedule uplink and/or downlink transmission for UEs in the subframe in which silencing is performed in the cell having transmitted the ICIC message.

Silencing may refer to an operation in which a specific cell does not transmit most of the signals (or transmits with zero power or weak power) in a specific subframe on uplink and downlink. As an example of the silencing operation, a specific cell may configure a specific subframe as an almost blank subframe (ABS) with multicast broadcast single frequency network (MBSFN). For a DL subframe configured as the ABS with MBSFN, a signal is transmitted only in the control region and not transmitted in the data region, as shown in FIG. 7(a). As another example of the silencing operation, a cell applying interference may configure a specific subframe as an ABS with MBSFN. As shown in FIG. 7(b), an ABS may refer to a DL subframe in which only a CRS is transmitted and other control information and data are not transmitted (or only transmission of weak power is performed) in the control region and data region. However, in the ABS, DL channels such as PBCH, PSS and SSS and DL signals may be transmitted. As described above, the silencing operation may be performed on the specific subframe basis, and information indicating whether or not the silencing is performed may be referred to as an ABS subframe pattern (hereinafter, referred to as ABS. If not stated otherwise, ABS may be understood as representing one of the "ABS with MBSFN" and "ABS").

Regarding ABS, ABS-related signaling defined in the current 3GPP LTE-A standard is broadly classified into ABS information and ABS status. ABS information is information about a subframe used as an ABS which is represented by a bitmap. In FDD, the information is configured with a bitmap of 40 bits. In TDD, the bitmap, which varies depending on the UL-DL configuration, has up to 70 bits. In FDD, for example, 40 bits represent 40 subframes, a bit indicates ABS when set to 1, and indicates non-ABS when set to 0. When restricted measurement is configured for a UE, the UE is informed of the number of CRS antenna ports of a corresponding cell for CRS measurement. The measurement subset is a subset of ABS pattern information represented by a bitmap having 40 bits in FDD and up to 70 bits in TDD. The measurement subset may be understood as a restricted measurement recommendation for configuring the restricted measurement for the UE. The ABS status information element is used to assist in determining whether an eNB needs to change the ABS pattern.

Change of UL Subframe to DL Subframe

Referring back to FIG. 1, in LTE/LTE-A, subframes of a type 2 radio frame of TDD (except a special subframe for switching between UL and DL) are respectively pre-configured to be used for uplink or downlink. More specifically, referring to Table 1 below, for example, when the UL-DL configuration is 0, subframes 0 and 5 of a radio frame may be pre-configured to be used for downlink, and subframes 2, 3, 4, 7, 8 and 9 may be pre-configured to be used for UL.

UL-DL configuration to be used by a specific eNB may be provided to the UE as part of system information. In addition, neighboring eNBs are forced to use the same TDD configuration, i.e., the same UL-DL configuration for a reason such as interference.

TABLE 1

| UL-DL config- uration | DL-to-UL switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |

(D: a subframe for DL transmission, U: a subframe for UL transmission, S: a special subframe)

When a system is operated according to the UL-DL configurations shown in Table 1, if the amount of data transmitted on UL or DL drastically increases, at least one subframe configured as a UL subframe may be changed to and used as a DL subframe, or at least one subframe configured as a DL subframe may be changed/switched to and used as a UL subframe, in order to ensure smooth transmission of data. In this case, transmission may be performed with a lower transmission power than in a normal DL subframe to reduce interference to a neighboring cell (e.g., interference of UL transmission of a neighboring cell which uses the same UL-DL configuration as a UL subframe is changed to a DL subframe).

A "reduced ABS" which is an ABS transmitted with a reduced power may be another example of the case in which a transmission power of a specific DL subframe is lower than other normal DL subframes.

If the transmission power of a specific DL subframe is (significantly) low compared to the transmission power of the other normal subframes as in the above exemplary case, the UE may smoothly receive signals. In other words, if DL transmission power drastically changes, the receiver of the UE fails to track such change, and thus demodulation performance thereof may be lowered. More specifically, for example, a power tracking module such as an automatic gain control (AGC) module may not properly operate.

In the embodiments of the present invention disclosed below, descriptions will be given of methods related to introduction of a ramping period (or a transient interval) allowing the UE to track drastic change in power without affecting the configuration of the existing system, e.g., the length of a radio frame, in order to solve a problem occurring when the transmission power suddenly changes.

In the embodiments described below, it is assumed that a subframe configured to be used for UL in TDD is used for DL signal transmission as a possible case in which the transmission power of the specific DL subframe changes. However, embodiments of the present invention are not limited thereto. The same/similar principle may be applied to other cases such as FDD or the "reduced ABS". Hereinafter, a specific sub frame that an eNB uses for DL signal transmission among the subframes configured to be used for UL is referred to as a UD subframe (or a first subframe).

Before description of embodiments, timing advance (TA) in conventional LTE/LTE-A will be briefly reviewed for understanding of the embodiments.

Figure 8:
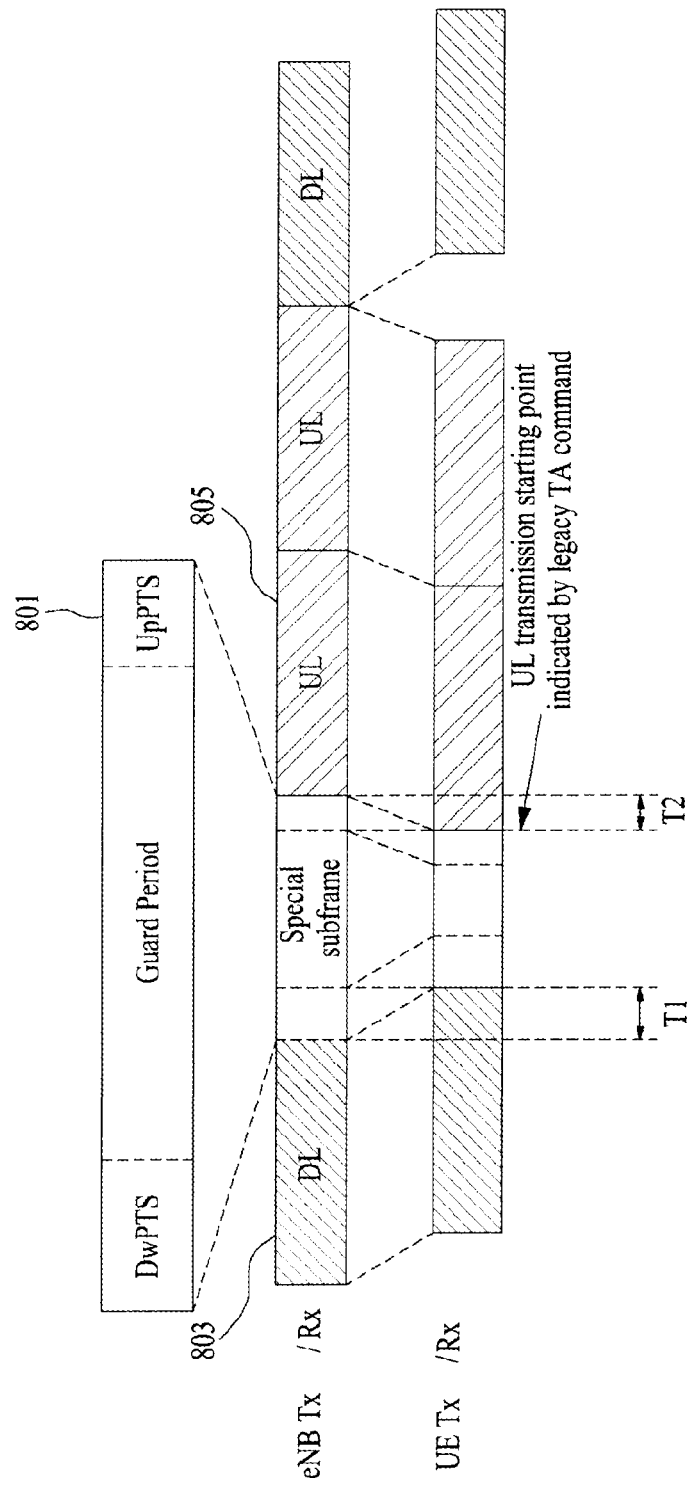
FIG. 8 is a diagram illustrating timing advance in TDD.

In LTE/LTE-A, timing advance refers to a factor (value) that adjusts transmission timing in consideration of propagation delay in signal transmission and reception between an eNB and a UE. FIG. 8 is a diagram illustrating timing advance in TDD. In the example of FIG. 8, UL-DL configuration 1 is assumed.

Referring to FIG. 8, in the case of TDD, a special subframe 801 in relation to the timing advance adjusts transmission/reception timing according to DL (propagation) delay and UL (propagation) delay. Specifically, a guard period of a special subframe compensates for time T1 taken for a DL signal transmitted in a DL subframe 803 to reach the UE due to (propagation) delay and time T2 taken for a UL signal transmitted in a subframe 805, configured to be used for UL, to reach the eNB due to (propagation) delay. That is, the guard period of the special subframe buffers a timing difference between a DL signal arriving late due to DL delay and a UL signal that the eNB needs to transmit earlier to meet the reception timing, so as to coordinate the overall timing.

Embodiment 1

In Embodiment 1, a description will be given of a method for applying additional timing advance (hereinafter, referred to as A-TA) for a ramping period in which a UE can track a drastic change in power. A-TA is timing advance by name, but may not be exactly the same as the conventional TA in that it is intended to create a kind of gap between the timelines of an eNB and a UE. The A-TA may be applied to a special subframe/guard period of the special subframe, which may be understood as establishing a ramping period enabling the UE to track the change in power by adjusting the UL signal reception timing of the eNB. Alternatively, the transmission timing of a UD subframe may be determined by a special subframe preceding the UD subframe, and the A-TA may be applied to the special subframe (namely, the length of the special subframe is reduced by the A-TA). Alternatively, the transmission timing of a UD subframe may be determined by a subframe subsequent to the special subframe among the UL subframes preceding the UD subframe. The subframe subsequent to the special subframe may be a subframe subjected to the A-TA (i.e., a subframe that the UE transmits by applying the A-TA (along with the TA)).

Figure 9:
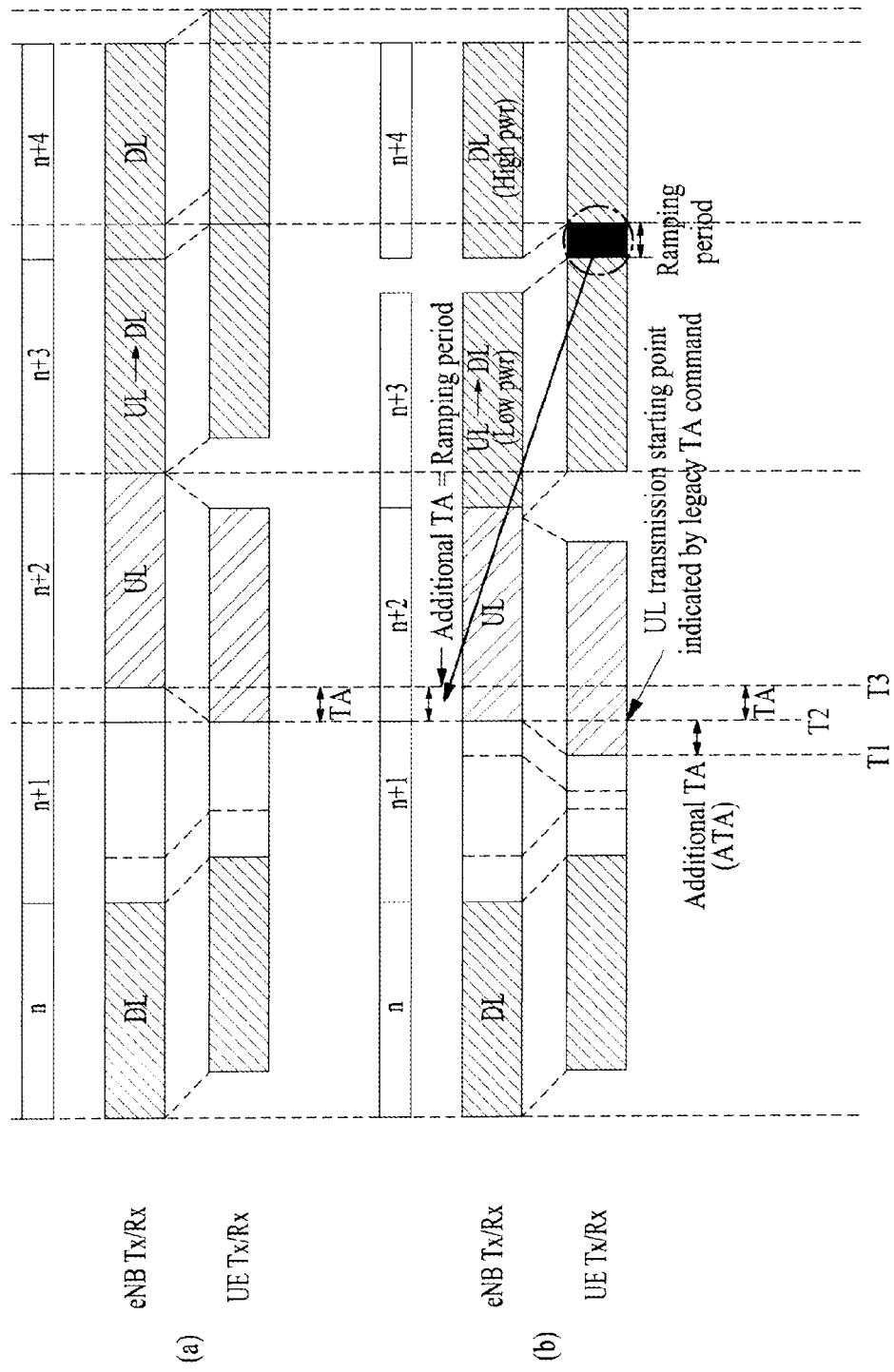
FIGS. 9 to 12 are diagrams illustrating setting of a ramping period according to embodiments of the present invention.

Embodiment 1 will be specifically described with reference to FIG. 9.

FIG. 9(a) illustrates a case in which the A-TA is not applied, namely a case in which only the TA of conventional LTE/LTE-A is applied. As shown in FIG. 9(a), the UE applies the TA when it transmits a UL signal in a UL subframe (subframe (n+2)) subsequent to a special subframe (subframe (n+1)). In this case, if the eNB uses a subframe configured to be used for UL in transmitting a DL signal and performs transmission with a transmission power lower than in a normal DL subframe (e.g., subframe (n+4)) in consideration of interference, the UE may fail in performing demodulation after receiving a subframe (subframe (n+4)) subsequent to the UD subframe (subframe (n+3)) since time to track the power change lacks. To address this problem, A-TA may be applied as shown in FIG. 9(b).

Referring to FIG. 9(b), in transmitting a UL subframe (subframe (n+2)) subsequent to the special subframe (subframe (n+1)), the UE applies the TA and the A-TA and performs transmission at time t1. In this case, time t2 at which the eNB receives the UL subframe (subframe (n+2)) becomes earlier than the reception time t3, which corresponds to the case in which the A-TA is not applied, by the A-TA value. The eNB may insert the time corresponding to the A-TA between the UD subframe (subframe (n+3)) and the DL subframe (subframe (n+4)) subsequent to the UD subframe. In other words, after transmitting a DL signal in the UD subframe (subframe (n+3)), the eNB may provide a ramping period to allow the UE to perform power tracking until transmission is performed in a DL subframe (subframe (n+4)) subsequent to the UD subframe. Herein, providing the ramping period in part means that the eNB transmits a known signal, a dummy signal, or an appointed signal for tracking to allow the UE to perform power tracking for the ramping period. In addition, the power for transmitting a signal such as the dummy signal may be equal to the transmission power used in normal DL subframes.

That is, the eNB may shorten the interval of the special subframe (subframe (n+1)) by the period during which the UE can track the power change between DL subframes, and signal the period to the UE through an A-TA command.

Upon receiving the A-TA command, the UE may assume that there is a ramping period for power tracking between the UD subframe and the subsequent DL subframe. Alternatively, the eNB may indicate the location of the ramping period corresponding to the A-TA on the timeline through, for example, higher layer signaling.

Embodiment 2

Embodiment 2 relates to use of a fake special subframe configuration.

A fake special subframe configuration may be defined in addition to the existing subframe configurations. In this special subframe configuration, the next UL subframe may begin in the UpPTS interval. An OFDM symbol in which the next UL subframe begins may also be signaled.

Figure 10:
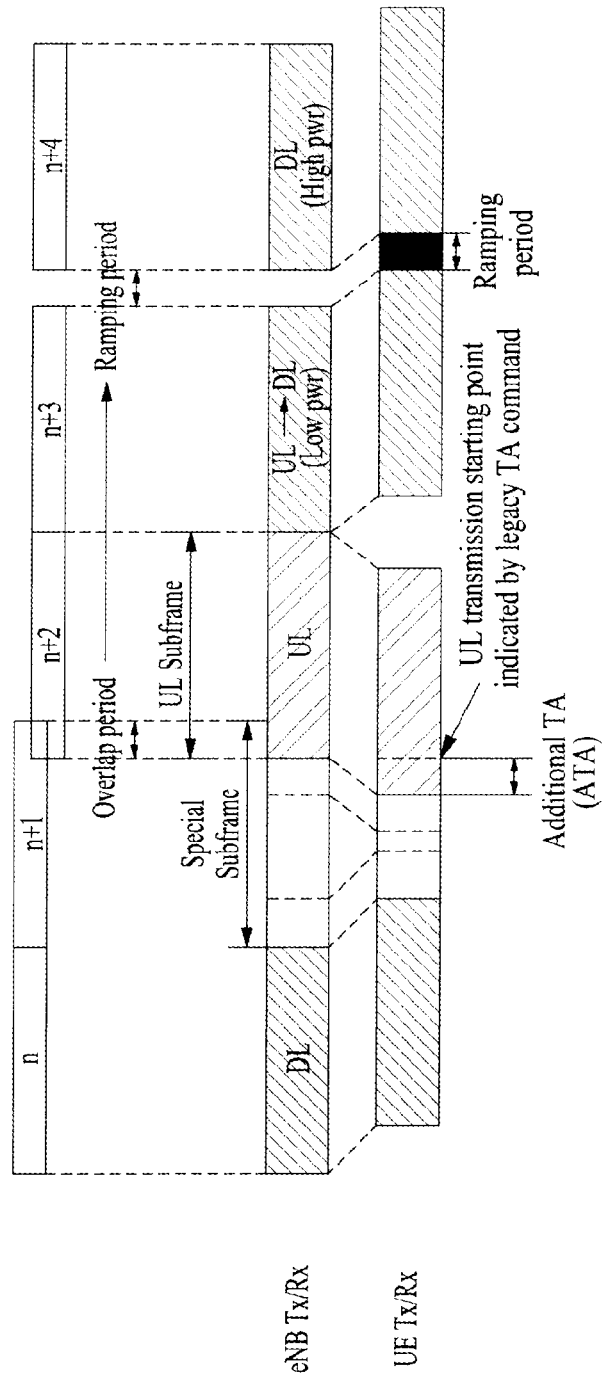

That is, as shown in FIG. 10, in the case in which the UD subframe (subframe (n+3)) is applied/configured, transmission of a UL subframe (subframe (n+2)) may begin in the UpPTS interval of the special subframe of the existing subframe configuration according to the fake special subframe configuration, in order to secure the ramping period (corresponding to the A-TA). Thereby, an overlap period in which the special subframe of the existing subframe configuration overlaps the UL subframe (subframe (n+2)) may be produced. Herein, the overlap period may be set to be equal to or longer than the power tracking period of the UE.

In Embodiment 1 and Embodiment 2 described above, the eNB may indicate information about the transmission power thereof in the UD subframe through higher layer signaling to the UE in order to complete tracking within the ramping period for power tracking. The signaling may indicate an absolute value of power or a ratio (in dB) of the transmission power to the power of a normal DL subframe. The transmission power value may be fixed to a predefined value.

In Embodiment 1 and Embodiment 2, the UE may be construed as being capable of tracking the power difference between subframes by securing time for the tracking as the eNB shortens and transmits a special subframe within a certain period for the UD subframe whose usage changes within the period. To this end, the eNB may signal information about whether the usage of a subframe changes and about the power difference, the length of gap (i.g., A-TA) for tracking the power difference, the location of the gap, etc. The UE tracks the power difference through adjustment of transmission and reception timing based on the signaled information. This process includes a process of recognizing that the DMRS pattern is changeable. In this process, the A-TA may have a preset value, or may be implemented in a manner that the eNB signals a specific TA value. In the case in which a preset value is used, the preset value may be determined by defining a minimum requirement for tracking the power difference.

Embodiment 3

Embodiment 3 relates to a method for applying rate matching/puncturing with a ramping period included in the UD subframe and placed between the UD subframe and a subsequent DL subframe.

Figure 11:
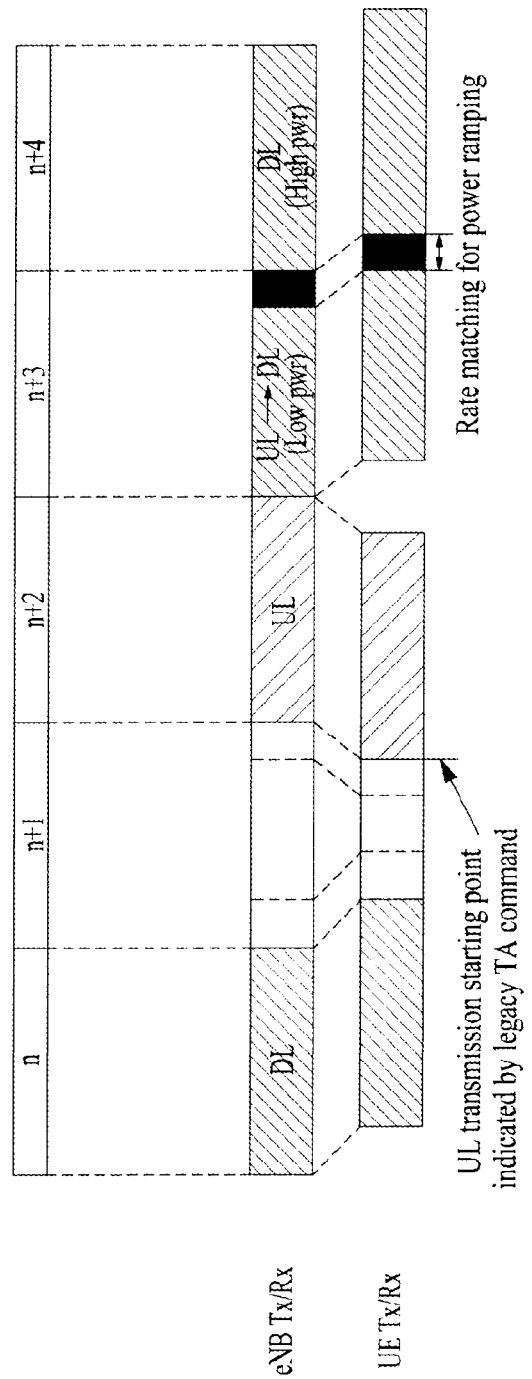

That is, as shown in FIG. 11, in the case in which the UD subframe (subframe (n+3)) is configured, at least one OFDM symbol from the end of the UD subframe may be used as a ramping period for power tracking of the UE. The eNB may perform rate matching for the OFDM symbol corresponding to the ramping period. In the OFDM symbol for which rate matching is performed, the eNB may transmit a known signal, a dummy signal, or an appointed signal for tracking to allow the UE to perform power tracking. In addition, the eNB may indicate resource information (e.g., a subframe and/or OFDM symbol) subjected to rate matching/puncturing through higher layer signaling to the UE.

In the case in which the ramping period is applied to the UD subframe as described above, restriction on use of DMRS or a DMRS of a new pattern is needed. Since the existing DMRS is mapped onto a resource including the last two symbols of a subframe, the DMRS of the second slot cannot be transmitted among the DMRSs when at least one OFDM symbol of the UD subframe from the end of UD subframe is used as a ramping period.

To address this issue, when the ramping period is applied to the UD subframe, the eNB may transmit only the DMRS of the first slot, and the UE may be configured to perform channel estimation using only the DMRS of the first slot.

Alternatively, in the case in which the UD subframe does not include a CRS (for example, the UD subframe is configured as an MBSFN subframe), the DMRS may be shifted forward by the number of rate-matched OFDM symbols. For example, the DMRS pattern for the existing special subframe may be used in the UD subframe such that DMRSs of 12 REs (or 24 Res for the rank higher than or equal to 3) present in the first and second slots are all used even when the last symbol of the subframe is rate-matched.

When the DMRS pattern for the conventionally defined special subframe is used as above, a new DMRS pattern does not need to be defined.

Application of the Present Invention to Device to Device (D2D) Communication

Figure 12:
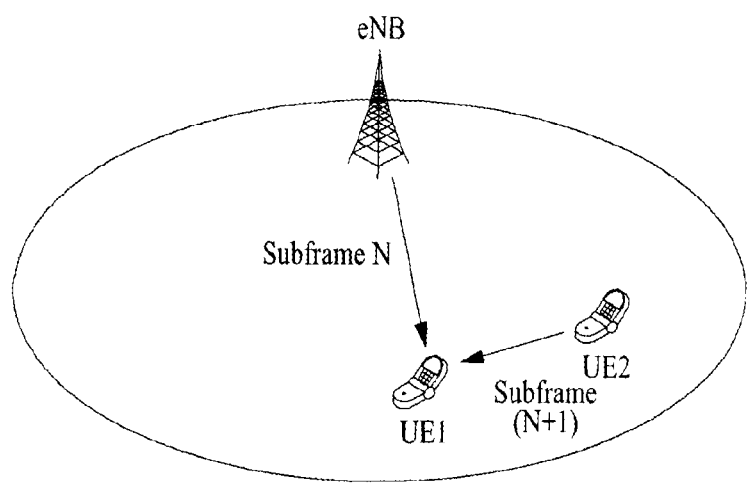

The embodiments described above may also be applied to D2D communication. Details will be described with reference to FIG. 12. In FIG. 12, it is assume that UE 1 receives a signal from an eNB in subframe N and receives a signal from UE 2 in subframe (N+1). In this case, if the channel quality between the UEs is sufficiently high, the difference between the power of the signal received from UE2 and the power of the signal received from the eNB may increase, and when the power difference increases beyond a certain level, tracking of the power different may be needed. To ensure the power tracking period, the embodiments described above may be applied. That is, by designing the UD subframe as a subframe for D2D in Embodiments 1 to 3, a period in which the difference between the reception power from the eNB and the reception power from UE2 can be tracked may be ensured.

To perform this operation in D2D, feedback information of UE1 may be additionally needed. That is, UE1 may feed the reception power from the eNB and the reception power from UE2, the power difference therebetween, and necessity of tracking of the power difference back to the eNB. Upon receiving the feedback, the eNB may signal an A-TA command and a subframe set for D2D, thereby ensuring power tracking for UE1. As a specific method for configuring a gap for tracking after feedback, Embodiments 1 to 3 may be used.

As another method of enabling power tracking in D2D communication, a new subframe structure for D2D communication may be configured. For example, in a subframe for D2D communication, the number of OFDM symbols may be reduced by one or two compared to the number of OFDM symbols in the conventional subframe, and a corresponding time may be disposed ahead of, behind, or at both ends of the subframe such that the time is used as a period for power tracking.

Figure 13:
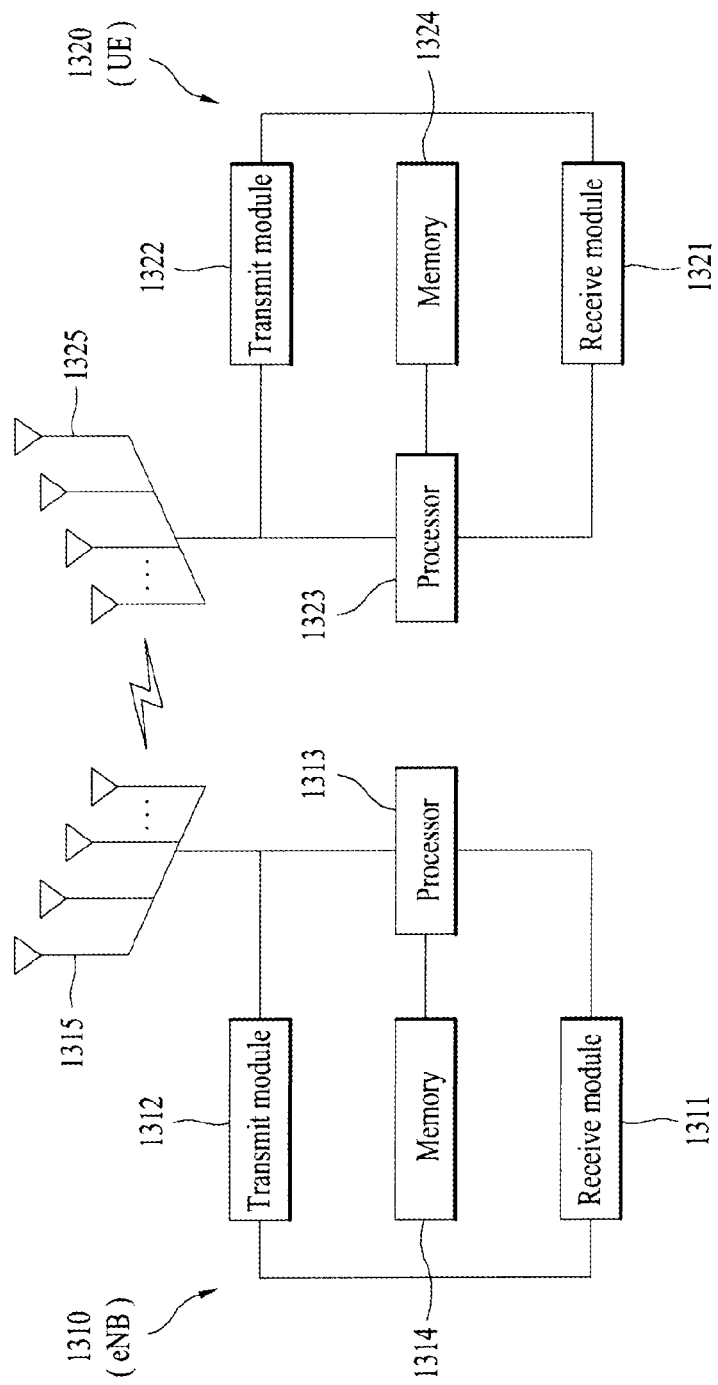
FIG. 13 is a diagram illustrating configuration of transceivers.

FIG. 13 is a diagram illustrating configuration of an eNB and a UE according to one embodiment of the present invention.

Referring to FIG. 13, an eNB 1310 may include a receive module 1311, a transmit module 1312, a processor 1313, a memory 1314, and a plurality of antennas 1315. The antennas 1315 represent an eNB that supports MIMO transmission and reception. The receive module 1311 may receive various signals, data and information from a UE on uplink. The transmit module 1312 may transmit various signals, data and information to a UE on downlink. The processor 1313 may control overall operation of the eNB 1310.

The processor 1313 of the eNB 1310 according to one embodiment of the present invention may operate to implement the embodiments described above.

Additionally, the processor 1313 of the eNB 1310 may function to operationally process information received by the eNB 1310 or information to be transmitted from the eNB 1310, and the memory 1314, which may be replaced with an element such as a buffer (not shown), may store the processed information for a predetermined time.

Referring to FIG. 13, a UE 1320 may include a receive module 1321, a transmit module 1322, a processor 1323, a memory 1324, and a plurality of antennas 1325. The antennas 1325 represent a UE that supports MIMO transmission and reception. The receive module 1321 may receive various signals, data and information from the eNB on downlink.

The transmit module 1322 may transmit various signals, data and information to the eNB on uplink. The processor 1323 may control overall operation of the UE 1320.

The processor 1323 of the UE 1320 according to one embodiment of the present invention may operate to implement the embodiments described above.

Additionally, the processor 1323 of the UE 1320 may function to operationally process information received by the UE 1320 or information to be transmitted from the UE 1320, and the memory 1324, which may be replaced with an element such as a buffer (not shown), may store the processed information for a predetermined time.

The configurations of the transmission point apparatus and the UE as described above may be implemented such that the above-described embodiments are independently applied or two or more thereof are simultaneously applied, and description of redundant parts is omitted for clarity.

Description of the eNB 1310 in FIG. 13 may be equally applied to a relay as a downlink transmitter or an uplink receiver, and description of the UE 1320 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for transmitting a signal by a base station in a wireless communication system, comprising:
   transmitting a first downlink signal in an $N^{th}$ subframe configured to be used for uplink, wherein the first downlink signal is transmitted in the $N^{th}$ subframe excluding at least one OFDM symbol at the end of the $N^{th}$ subframe; and
   transmitting a second downlink signal in an $(N+1)^{th}$ subframe configured to be used for downlink,
   wherein there is a specific time period between the end of transmitting the first downlink signal and the beginning of transmitting the second downlink signal, and the specific time period corresponds to the at least one OFDM symbol at the end of the $N^{th}$ subframe,
   where N is an integer.

2. The method according to claim 1, wherein a predetermined signal is transmitted in the specific time period.

3. The method according to claim 1, wherein transmission power in the $N^{th}$ subframe is set to be lower than transmission power of the $(N+1)^{th}$ subframe.

4. The method according to claim 2, wherein the predetermined signal is one of a signal appointed for power tracking between a user equipment and the base station or a dummy signal.

5. The method according to claim 1, wherein the first downlink signal is transmitted in all of the $N^{th}$ subframe and the second downlink signal is transmitted in all of the $(N+1)^{th}$ subframe, and
   wherein the specific time period corresponds to a gap between the $N^{th}$ subframe and the $(N+1)^{th}$ subframe.

6. A method for receiving a signal by a user equipment in a wireless communication system, comprising:
   receiving a first downlink signal from a base station in an $N^{th}$ subframe configured to be used for uplink, wherein the first downlink signal is received in the $N^{th}$ subframe excluding at least one OFDM symbol at the end of the $N^{th}$ subframe; and
   receiving a second downlink signal from the base station in an $(N+1)^{th}$ subframe configured to be used for downlink,
   wherein there is a specific time period between the end of receiving the first downlink signal and the beginning of receiving the second downlink signal, and the specific time period corresponds to the at least one OFDM symbol at the end of the $N^{th}$ subframe,
   where N is an integer.

7. The method according to claim 6, further comprising: performing power tracking in the specific time period.

8. The method according to claim 6, wherein transmission power in the $N^{th}$ subframe is set to be lower than transmission power of the $(N+1)^{th}$ subframe.

9. The method according to claim 6, wherein the first downlink signal is received in all of the $N^{th}$ subframe and the second downlink signal is received in all of the $(N+1)^{th}$ subframe, and wherein the specific time period corresponds to a gap between the $N^{th}$ subframe and the $(N+1)^{th}$ subframe.

10. A base station in a wireless communication system, comprising:
- a radio frequency (RF) unit; and
- a processor that controls the RF unit to:
- transmit a first downlink signal in an $N^{th}$ subframe configured to be used for uplink, and
- transmit a second downlink signal in an $(N+1)^{th}$ subframe configured to be used for downlink, wherein the first downlink signal is transmitted in the $N^{th}$ subframe excluding at least one OFDM symbols at the end of the $N^{th}$ subframe,
- wherein there is a specific time period between the end of transmitting the first downlink signal and the beginning of transmitting the second downlink signal, and the specific time period corresponds to the at least one OFDM symbol at the end of the $N^{th}$ subframe,
- where N is an integer.

11. A user equipment in a wireless communication system, comprising:
- a radio frequency (RF) unit; and
- a processor that controls the RF unit to:
- receive a first downlink signal from a base station in an $N^{th}$ subframe configured to be used for uplink, and
- receive a second downlink signal from the base station in an (N+1)th subframe configured to be used for downlink, wherein the first downlink signal is received in the $N^{th}$ subframe excluding at least one OFDM symbols at the end of the $N^{th}$ subframe,
- wherein there is a specific time period between the end of receiving the first downlink signal and the beginning of receiving the second downlink signal, and the specific time period corresponds to the at least one OFDM symbol at the end of the $N^{th}$ subframe,
- where N is an integer.

* * * * *